United States Patent
Weik et al.

(10) Patent No.: US 12,427,693 B2
(45) Date of Patent: Sep. 30, 2025

(54) CIRCULAR SAWS INCLUDING TRANSPARENT WINDOWS THAT EXTEND WITHIN BLADE GUARD OPENINGS AND COVER FASTENING STRUCTURES

(71) Applicant: Festool GmbH, Wendlingen am Neckar (DE)

(72) Inventors: Jonathan Weik, Filderstadt (DE); Wolfgang Spengler, Neidlingen (DE)

(73) Assignee: Festool GmbH, Wendlingen am Neckar (DE)

( * ) Notice: Subject to any disclaimer, the term of this patent is extended or adjusted under 35 U.S.C. 154(b) by 452 days.

(21) Appl. No.: 17/919,648

(22) PCT Filed: Jun. 23, 2021

(86) PCT No.: PCT/EP2021/067136
§ 371 (c)(1),
(2) Date: Oct. 18, 2022

(87) PCT Pub. No.: WO2021/259999
PCT Pub. Date: Dec. 30, 2021

(65) Prior Publication Data
US 2023/0158706 A1   May 25, 2023

Related U.S. Application Data

(60) Provisional application No. 63/044,034, filed on Jun. 25, 2020.

(51) Int. Cl.
*B27G 19/10*   (2006.01)
*B23D 45/16*   (2006.01)
(Continued)

(52) U.S. Cl.
CPC ............. *B27G 19/10* (2013.01); *B23D 45/16* (2013.01); *B23D 59/003* (2013.01); *B23Q 11/06* (2013.01);
(Continued)

(58) Field of Classification Search
CPC ........ B27G 19/02; B27G 19/04; B27G 19/10; B23D 59/002; B23D 59/003; B23D 45/16;
(Continued)

(56) References Cited

U.S. PATENT DOCUMENTS 2,562,396 A * 7/1951 Schutz ................... B27G 19/02
83/483
4,892,022 A * 1/1990 Cotton ..................... B27G 5/02
83/490

(Continued)

FOREIGN PATENT DOCUMENTS

CN    207310133 U   5/2018
DE    3104340 A1    2/1982
(Continued)

OTHER PUBLICATIONS

English language translation of DE-20100087-U1 to Festo Tooltechnic GmbH & Co.*
(Continued)

*Primary Examiner* — Evan H MacFarlane
(74) *Attorney, Agent, or Firm* — Lucian Wayne Beavers; Patterson Intellectual Property Law, PC

(57) ABSTRACT

Circular saws with transparent windows that extend within blade guard openings and cover fastening structures. The circular saws include a motor and an arbor configured to operatively attach a circular saw blade to the circular saw. The circular saws also include a blade guard. The blade guard includes a blade guard opening, which is positioned to
(Continued)

permit a user of the circular saw to view a leading edge of the circular saw blade as the circular saw cuts a workpiece. The circular saws also include a transparent window, which extends within the blade guard opening, and a cover fastening structure, which is configured to selectively attach a splinter guard to the blade guard while the transparent window extends within the blade guard opening.

17 Claims, 16 Drawing Sheets

(51) Int. Cl.
    *B23D 59/00*     (2006.01)
    *B23Q 11/06*     (2006.01)
    *B23Q 11/08*     (2006.01)
    *B25F 5/02*     (2006.01)
    *B27B 9/04*     (2006.01)
    *B27G 19/04*     (2006.01)
    *B23D 47/02*     (2006.01)
    *B27B 9/02*     (2006.01)

(52) U.S. Cl.
    CPC .............. *B23Q 11/08* (2013.01); *B25F 5/021* (2013.01); *B27B 9/04* (2013.01); *B27G 19/04* (2013.01); *B23D 47/02* (2013.01); *B27B 9/02* (2013.01)

(58) Field of Classification Search
    CPC .. B27B 9/00; B27B 9/04; B23Q 11/06; B23Q 11/08; B23Q 17/2404; B25F 5/00; B25F 5/02; B25F 5/021
    See application file for complete search history.

(56) References Cited

U.S. PATENT DOCUMENTS

| | | | |
|---|---|---|---|
| 8,435,437 | B2 | 5/2013 | Jow |
| 2001/0033742 | A1* | 10/2001 | Weaver .................. H02K 15/12 |
| | | | 388/937 |
| 2002/0002774 | A1 | 1/2002 | Onose et al. |
| 2003/0047050 | A1 | 3/2003 | Onose et al. |
| 2007/0180710 | A1* | 8/2007 | Moore .................. B27G 19/04 |
| | | | 30/391 |

FOREIGN PATENT DOCUMENTS

| | | | | |
|---|---|---|---|---|
| DE | 20100087 U1 * | 3/2001 | ............... | B27B 9/00 |
| EP | 810070 A2 | 12/1997 | | |
| EP | 1258305 A2 | 11/2002 | | |
| EP | 1387731 A1 | 2/2004 | | |
| JP | 5756109 U | 4/1982 | | |
| JP | 05318403 A | 12/1993 | | |
| WO | 02081134 A1 | 10/2002 | | |

OTHER PUBLICATIONS

English language translation of JPH05318403A to Matsushita obtained from https://worldwide.espacenet.com/.*
Japan Office Action for corresponding patent application No. 2022-577497, dated Jan. 6, 2024, 9 pages includes translation (not prior art).
International Search Report and Written Opinion for corresponding patent application No. PCT/EP2021/067136, dated Oct. 18, 2021, 12 pages (not prior art).
Japanese Office Action for corresponding patent application No. 2022-577497, dated Jan. 6, 2024, 9 pages includes translation (not prior art).

* cited by examiner

CIRCULAR SAWS INCLUDING TRANSPARENT WINDOWS THAT EXTEND WITHIN BLADE GUARD OPENINGS AND COVER FASTENING STRUCTURES

RELATED APPLICATION

This application claims priority to U.S. Provisional Patent Application No. 63/044,034, which was filed on Jun. 25, 2020, and the complete disclosure of which is hereby incorporated by reference.

FIELD OF THE DISCLOSURE

The present disclosure is directed generally to circular saws with transparent windows that extend within blade guard openings and cover fastening structures.

BACKGROUND OF THE DISCLOSURE

Circular saws utilize a rotating circular saw blade to cut a workpiece. The rotating circular saw blade may be hazardous. As such, conventional circular saws generally include a blade guard that at least partially covers the rotating circular saw blade. In some instances, it may be desirable to permit a user to view a leading edge of the circular saw blade as the circular saw is utilized to cut the workpiece, such as to permit and/or facilitate a desired and/or accurate location for an end of a cut that is formed by the circular saw blade within the workpiece. Some conventional circular saws may have an at least partially exposed circular saw blade, which may permit such viewing. While effective at permitting the user to view the circular saw blade, the at least partially exposed circular saw blade may present a safety hazard. More specifically, it may be possible for the user, or a foreign object, to contact an exposed region of the circular saw blade, thereby causing injury and/or damage. To mitigate this risk, some conventional circular saws include a removable cover, which may be utilized to selectively cover the exposed region of the circular saw blade. While installation of the removable cover decreases the risk of injury and/or damage, the removable cover also blocks the user from viewing the leading edge of the circular saw blade and must be removed for such viewing. When the removable cover is removed, the above risks still exist. Also to mitigate this risk, some conventional circular saws include ribs and/or fingers that project from the blade guard and are configured to decrease the potential for contact between the user and the rotating circular saw blade. While such ribs and/or fingers may be at least somewhat effective, the presence of the ribs and/or fingers may decrease a clearance between the blade guard and the circular saw blade, which may make it difficult to remove and/or to install the circular saw blade and/or may decrease an efficiency of dust collection within the circular saw. Thus, there exists a need for improved circular saws that include blade guards with transparent windows and cover fastening structures.

SUMMARY OF THE DISCLOSURE

Circular saws with transparent windows that extend within blade guard openings and cover fastening structures. The circular saws include a motor including a motor shaft configured to rotate about a shaft rotational axis. The circular saws also include an arbor configured to operatively attach a circular saw blade to the circular saw and to rotate the circular saw blade about an arbor rotational axis when the arbor receives a torque from the motor via rotation of the motor shaft about the shaft rotational axis. The circular saws further include a blade guard. The blade guard includes a blade guard opening, which is positioned to permit a user of the circular saw to view a leading edge of the circular saw blade as the circular saw cuts a workpiece. The circular saws also include a transparent window, which extends within the blade guard opening, and a cover fastening structure, which is configured to selectively attach a splinter guard to the blade guard while the transparent window extends within the blade guard opening.

DETAILED DESCRIPTION AND BEST MODE OF THE DISCLOSURE

Figure 1:
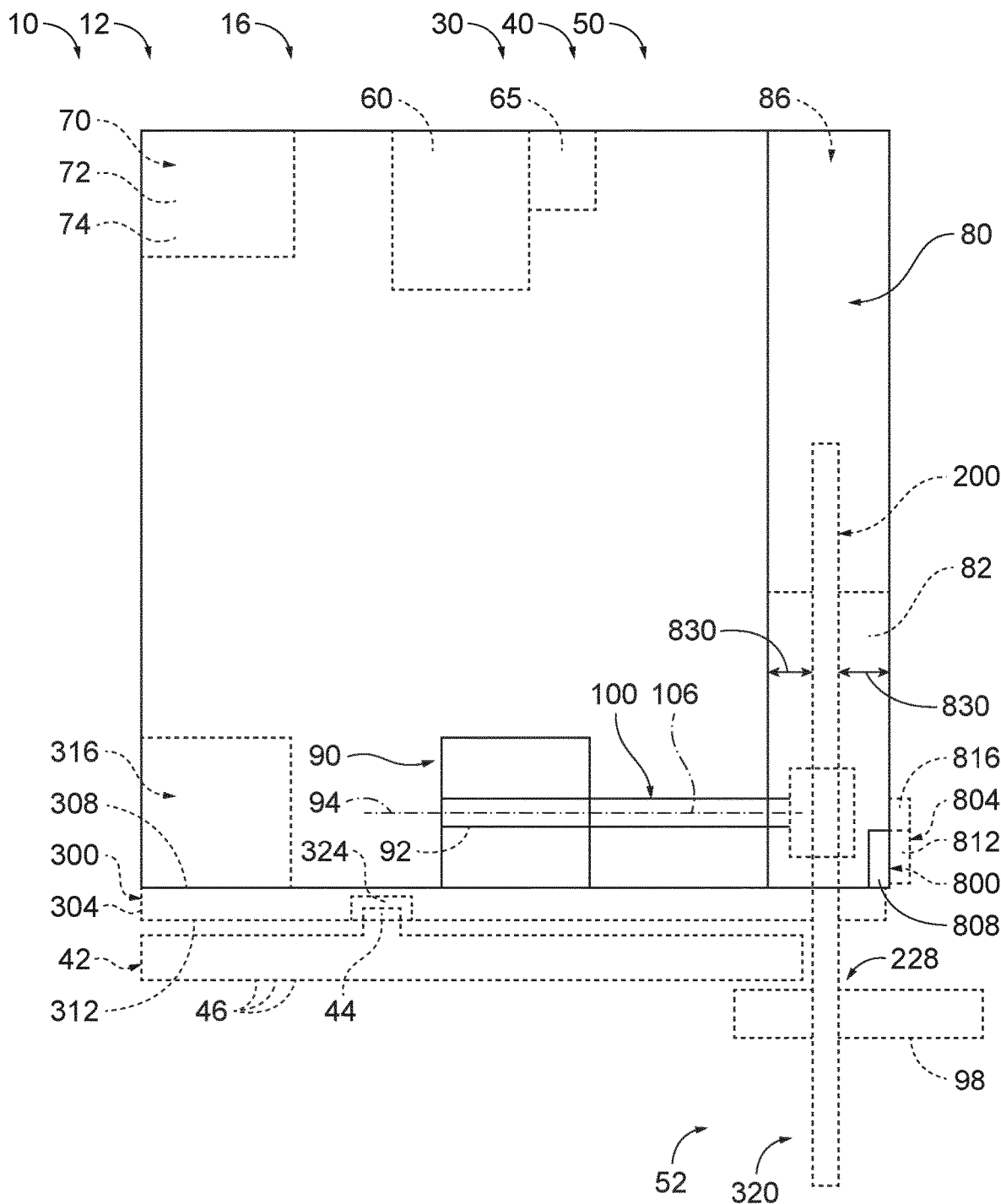
FIG. 1 is a schematic illustration of examples of a circular saw according to the present disclosure.

FIGS. 1-18 provide examples of circular saws 10 and/or of components of circular saws 10, according to the present disclosure. Elements that serve a similar, or at least substantially similar, purpose are labeled with like numbers in each of FIGS. 1-18, and these elements may not be discussed in detail herein with reference to each of FIGS. 1-18. Similarly, all elements may not be labeled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 2:
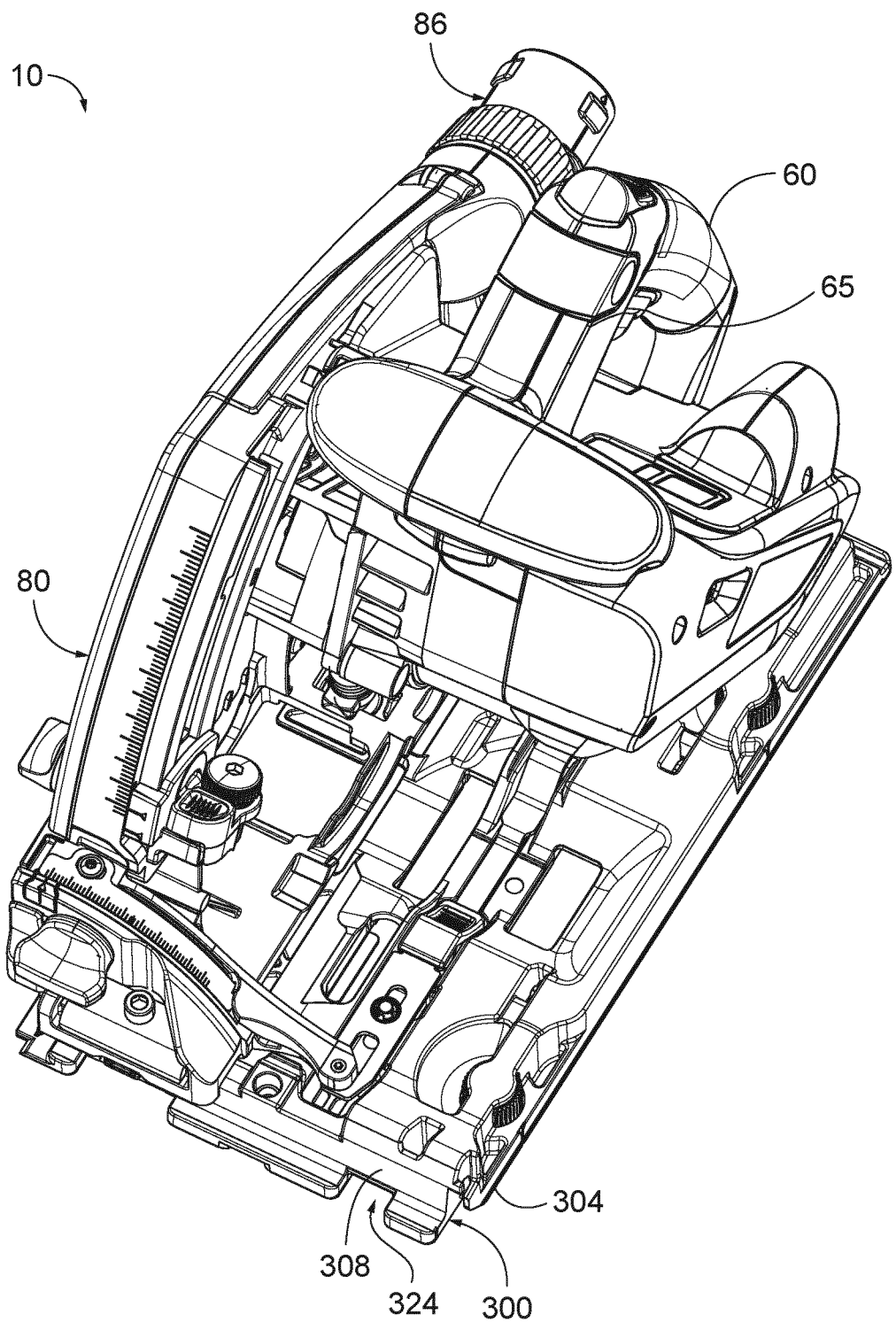
FIG. 2 is a less schematic top profile view of an example of a circular saw according to the present disclosure.
Figure 3:
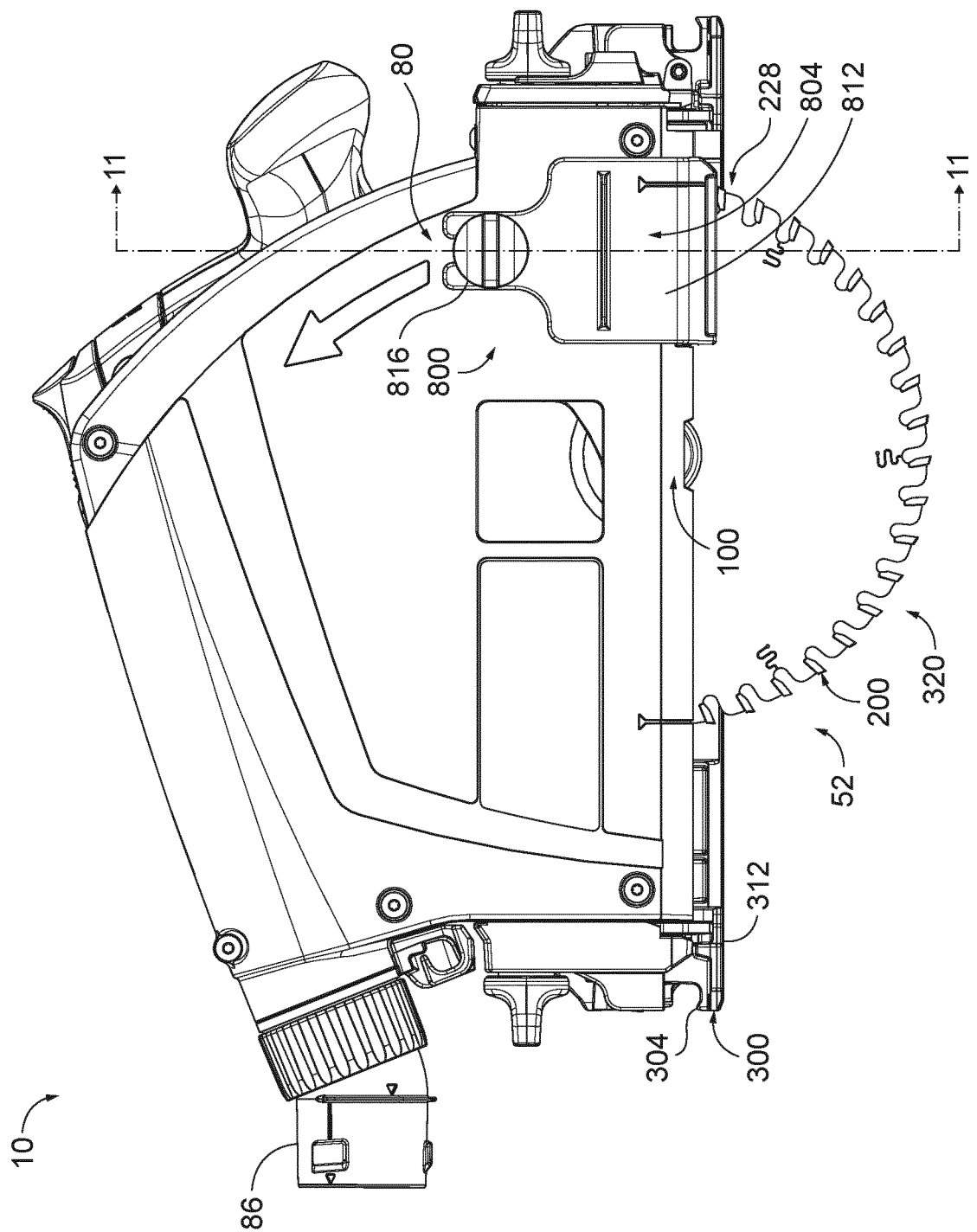
FIG. 3 is a less schematic right side view of an example of a circular saw according to the present disclosure.
Figure 4:
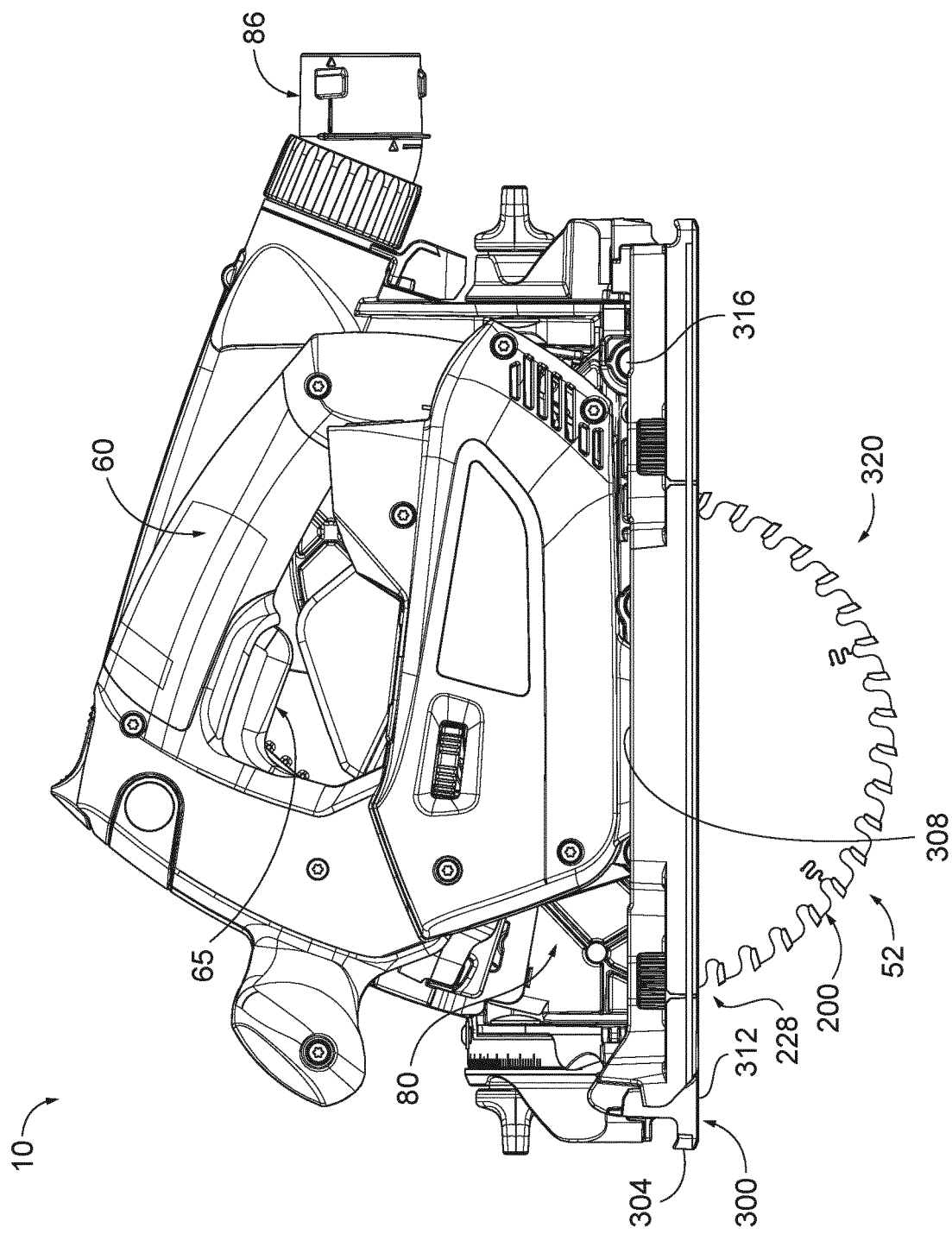
FIG. 4 is a less schematic left side view of an example of a circular saw according to the present disclosure.
Figure 5:
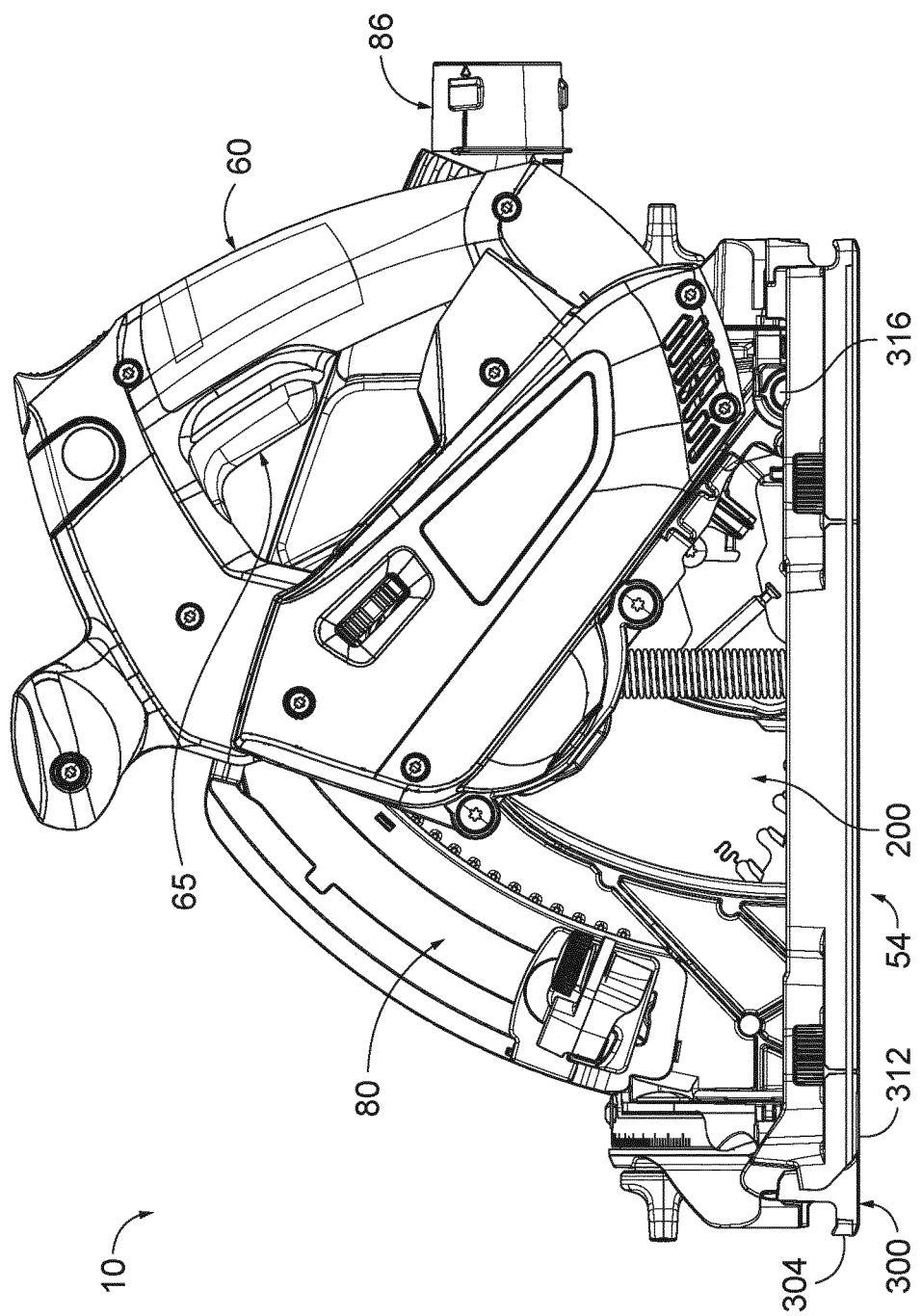
FIG. 5 is another less schematic left side view of an example of a circular saw according to the present disclosure.
Figure 6:
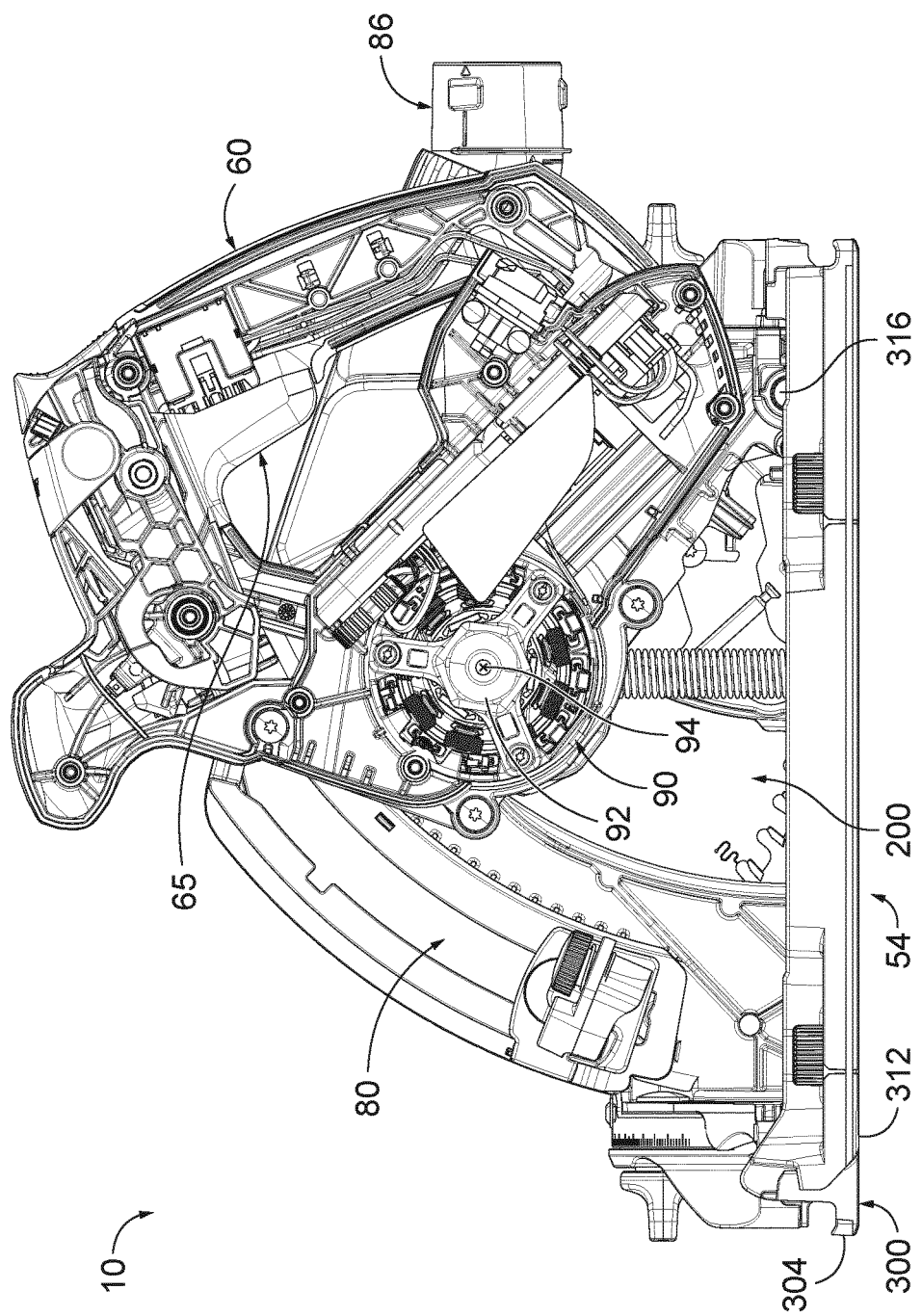
FIG. 6 is another less schematic left side view of an example of a circular saw according to the present disclosure.
Figure 7:
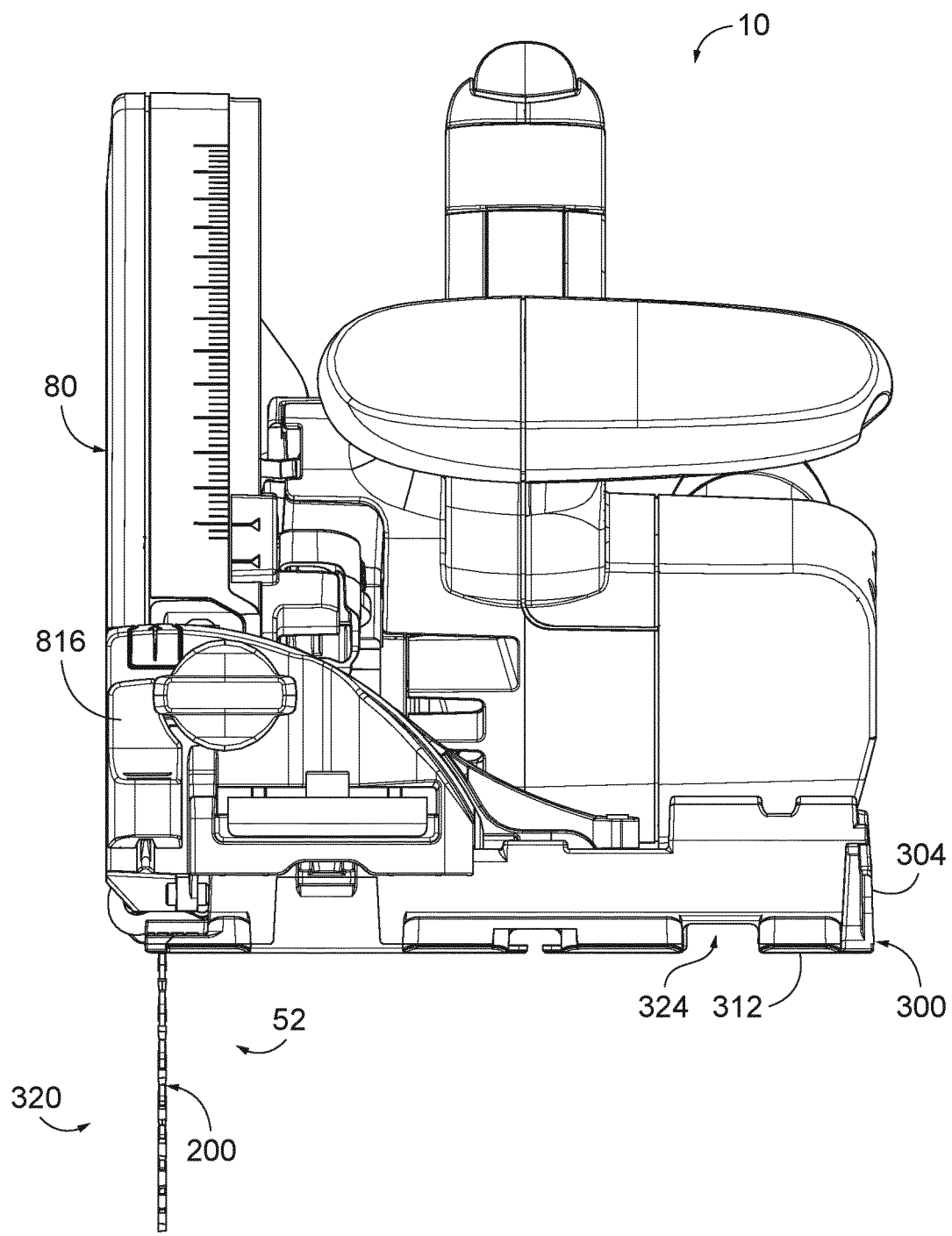
FIG. 7 is a less schematic front view of an example of a circular saw according to the present disclosure.
Figure 8:
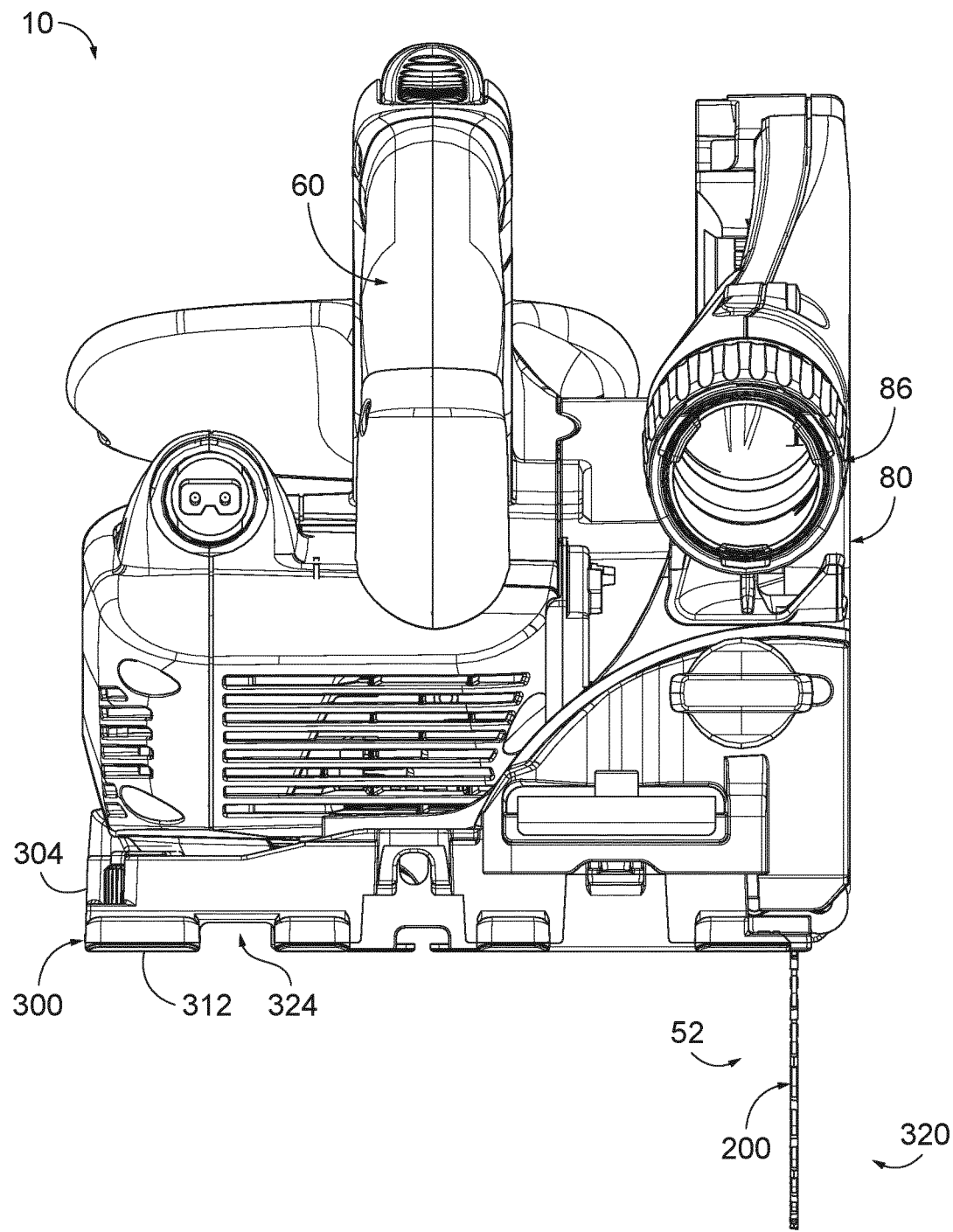
FIG. 8 is a less schematic rear view of an example of a circular saw according to the present disclosure.
Figure 9:
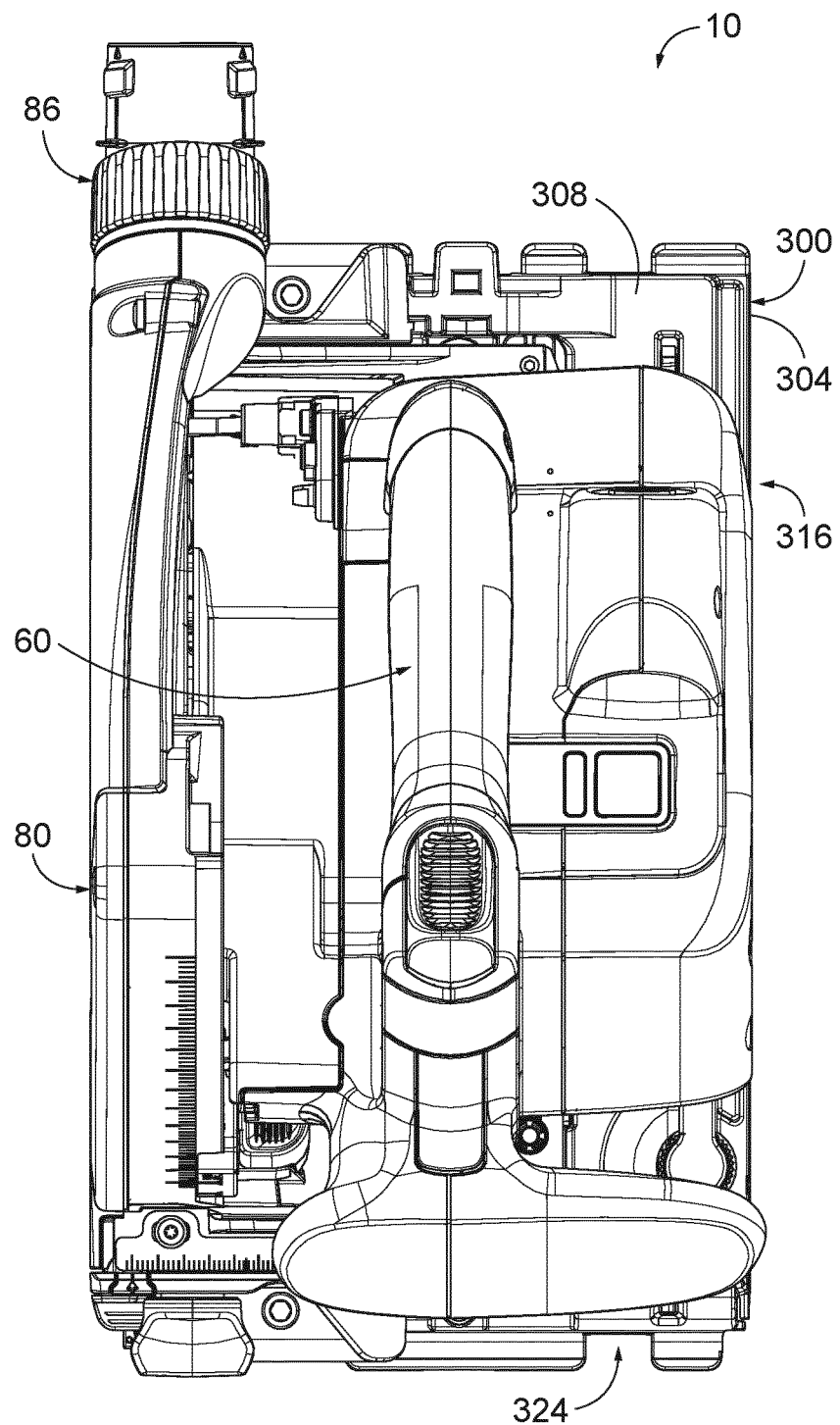
FIG. 9 is a less schematic top view of an example of a circular saw according to the present disclosure.
Figure 10:
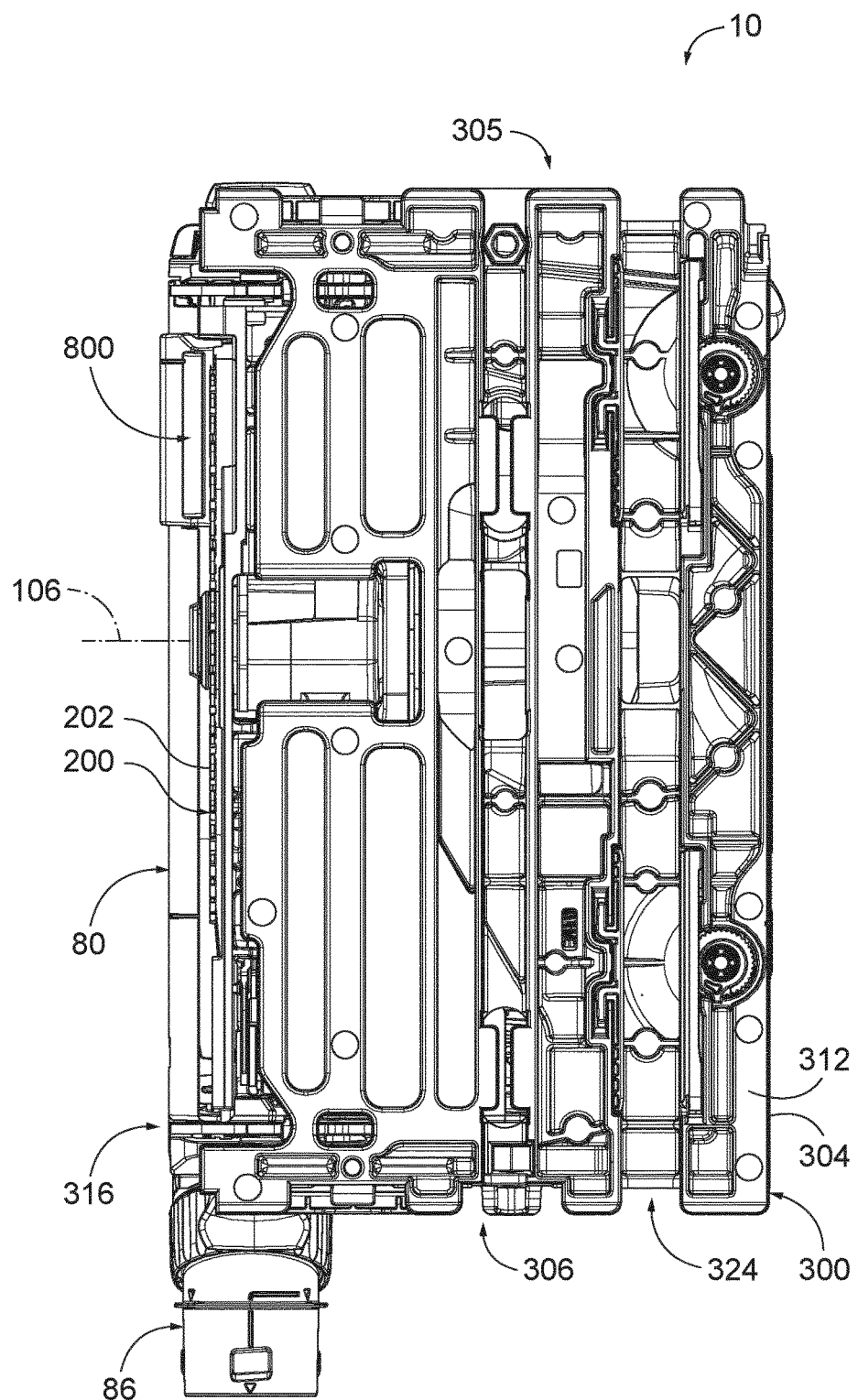
FIG. 10 is a less schematic bottom view of an example of a circular saw according to the present disclosure.

FIG. 1 is a schematic illustration of examples of circular saws 10 according to the present disclosure, while FIGS. 2-10 are less schematic illustrations of an example of a circular saw 10 according to the present disclosure. More specifically, FIG. 2 is a less schematic top profile view of an example of a circular saw 10, according to the present disclosure, FIG. 3 is a less schematic right side view of circular saw 10, and FIG. 4 is a less schematic left side view of circular saw 10. In addition, FIG. 5 is another less schematic left side view of circular saw 10, and FIG. 6 is yet another less schematic left side view of circular saw 10. FIG. 7 is a less schematic front view of circular saw 10, FIG. 8 is a less schematic rear view of circular saw 10, FIG. 9 is a less schematic top view of circular saw 10, and FIG. 10 is a less schematic bottom view of circular saw 10.

As illustrated collectively by FIGS. 1-10, circular saws 10 include a motor 90 that includes a motor shaft 92 configured to rotate about a shaft axis of rotation 94. Circular saws 10 also include an arbor 100 configured to operatively attach a circular saw blade 200 to the circular saw and to rotate the circular saw blade within a blade rotation plane and/or about an arbor rotational axis 106 when the arbor receives a torque from motor 90, such as when motor shaft 92 rotates about the shaft rotational axis. As illustrated in dashed lines in FIG. 1 and in solid lines in FIGS. 3-8 and 10, circular saws 10 also may include circular saw blade 200. Circular saw blade 200, when present, may be operatively attached to the circular saw via arbor 100 and/or may be configured for rotational movement with the arbor when the arbor rotates about arbor rotational axis 106. Rotation of circular saw blade 200 may facilitate cutting of a workpiece 98 with the circular saw blade, as schematically illustrated in FIG. 1.

Circular saws 10 also include a blade guard 80. Blade guard 80 includes a blade guard opening 800. Blade guard opening 800 is adapted, configured, shaped, sized, and/or positioned to permit a user of the circular saw to view a leading edge 228 of the circular saw blade as the circular saw cuts a workpiece. Circular saws 10 and/or blade guard 80 thereof also include a cover 804 in the form of a transparent window 808. Transparent window 808 covers blade guard opening 800.

During operation of circular saws 10, circular saw blade 200 may be rotated about arbor rotational axis 106. Concurrently, the circular saw blade may be engaged with workpiece 98, such as to cut the workpiece, as perhaps best illustrated in FIG. 1. During utilization of circular saws 10 to cut workpiece 98, the user may view leading edge 228 of circular saw blade 200 via and/or through transparent window 808.

Such a configuration may provide significant benefits over conventional circular saws that do not include transparent window 808. As an example, the transparent window may protect the user, or another object, from contact, including inadvertent contact, with the rotating circular saw blade, thereby decreasing a potential for injury to the user and/or damage to the other object when compared to conventional circular saws. Stated another way, transparent window 808 may define a physical barrier that prevents access to the circular saw blade and/or contact with the circular saw blade, via blade guard opening 800, while still permitting the user to view leading edge 228 of circular saw blade 200.

As another example, conventional circular saws that do not include transparent window 808 may include, or may be required to include, ribs and/or fingers that project from blade guards thereof and/or toward circular saw blades thereof, such as to decrease a potential for, or a clearance for, contact between the user and the rotating circular saw blade. Such ribs and/or fingers may decrease an efficiency of dust and/or debris collection in conventional circular saws when compared to circular saws 10, according to the present disclosure. More specifically, the absence of ribs and/or fingers within circular saws 10, according to the present disclosure, may decrease a resistance to airflow between leading edge 228 and a vacuum port 86 of circular saws 10. Vacuum port 86 may be configured for attachment of a vacuum, such as to permit and/or to facilitate collection of debris generated when the circular saw is utilized to cut the workpiece, and the decrease in resistance to airflow may increase the efficiency of debris collection. Additionally or alternatively, the presence of transparent window 808 may permit circular saws 10 to establish a higher level of vacuum within blade guard 80 when compared to conventional circular saws, thereby further increasing the efficiency of dust collection.

Circular saws 10 may include any suitable type or style of circular saw that is adapted, configured, designed, and/or constructed to utilize a circular saw blade 200 to cut workpiece 98. Examples of circular saws 10 include a handheld circular saw 12, a radial arm saw 16, a plunge saw 30, a track saw 40, and/or a bevel saw 50, as schematically illustrated in FIG. 1. In some examples, circular saws 10 may include structures and/or features from two or more of the above saws, and/or may incorporate functionality of two or more of the above saws. As an example, and as discussed in more detail herein, a given circular saw 10 may be and/or may incorporate functionality of handheld circular saw 12, plunge saw 30, track saw 40, and/or bevel saw 50. Circular saws 10 according to the present disclosure thus may include one or more of the features disclosed herein, but circular saws 10 are not required to include all of the features disclosed herein.

Motor 90 may include any suitable structure that may provide the motive force for rotation of motor shaft 92 and/or for actuation of circular saw blade 200. Examples of motor 90 include an electric motor, an AC electric motor, a DC electric motor, a brushless DC motor, a variable-speed motor, and/or a single-speed motor.

As illustrated in dashed lines in FIG. 1 and in solid lines in FIGS. 2, 4-6, and 8-9, circular saws 10 may include a gripping region 60 that is configured to be gripped and/or held by a user during operation of the circular saw. Gripping region 60, when present, also may be referred to herein as and/or may be a handle, or a hand grip.

As also illustrated in dashed lines in FIG. 1 and in solid lines in FIGS. 2 and 4-6, circular saws 10 may include at least one switch 65. Switch(es) 65, when present, may be configured to be selectively actuated by the user of the circular saw, such as to enable and/or permit electric current to be provided to at least one other component of the circular saw and/or to permit powered operation of the at least one other component of the circular saw. As examples, selective actuation of switch(es) 65 may be utilized to enable operation of a motor controller of the circular saw, to selectively apply an electric current to motor 90, to enable the motor controller to selectively apply the electric current to the motor, and/or to permit, or direct, the motor to provide the motive force for rotation of the motor shaft.

In some examples, the electric current may be utilized to power, or to directly power, at least one other component of the circular saw, such as motor 90. In some such examples, the electric current also may be referred to herein as an electric power signal. In some examples, the electric current may be an electric data signal that is sent to at least one other component of the circular saw, such as the motor controller of the circular saw. In some such examples, the electric current also may be referred to herein as a data signal and/or as an electric data signal. Examples of switch 65 include an electrical switch, a normally open electrical switch, a momentary electrical switch, and/or a locking momentary electrical switch.

As also illustrated in dashed lines in FIG. 1 and in solid lines in FIGS. 2-10, circular saws 10 may include a workpiece support 300. Workpiece support 300, when present, may be configured to support workpiece 98 and/or to position the circular saw and the workpiece relative to each other when the workpiece is cut or otherwise acted upon by the circular saw blade. For example, many circular saws 10 in the form of saws include workpiece support 300 in the form of a base plate, table, shoe, rack, or pad.

Circular saws 10 may include any suitable power source, and corresponding power structures, for powering motor 90. Examples of the power structures include a power supply structure 70, such as a power cord 72 and/or a battery 74, as illustrated in FIG. 1.

In some examples, and as discussed, circular saws 10 may include and/or be plunge saw 30. In examples of circular saws 10 that are or include a plunge saw 30, arbor 100 may be configured to move relative to workpiece support 300, such as to selectively vary a region 320 of circular saw blade 200 that projects from the workpiece support and/or to selectively vary a depth-of-cut of the circular saw, as illustrated in FIGS. 1, 3-4, and 7-8. For example, arbor 100 may be configured to pivot relative to workpiece support 300, as illustrated by the transition between a plunged orientation 52, as illustrated in FIGS. 1, 3-4, and 7-8, and a retracted orientation 54, as illustrated in FIGS. 5-6.

As a more specific example, workpiece support 300 may include and/or be a base plate 304 that defines an arbor-facing side 308 and an arbor-opposed side 312. Arbor 100 may be operatively attached to arbor-facing side 308 of base plate 304 with, via, and/or utilizing a base plate pivot 316. The arbor may be operatively attached to the base plate such that arbor-facing side 308 faces toward the arbor. In such examples, arbor 100 and base plate 304 may be configured to rotate, relative to one another, about base plate pivot 316, such as to selectively vary region 320 of circular saw blade 200 that extends on arbor-opposed side 312 of base plate 304.

Stated another way, arbor 100 may be configured to pivot relative to workpiece support 300 throughout a range of relative orientations, or relative angles, that may be bounded by a fully plunged orientation and a fully retracted orientation. For each relative orientation in this range of relative orientations, circular saw blade 200 may extend on arbor-opposed side 312 by a corresponding amount, thereby providing a corresponding depth-of-cut for the circular saw.

In some examples, and as discussed, circular saws 10 may include and/or be track saw 40. In examples of circular saws 10 that are or include a track saw 40, base plate 304 may include a rib-receiving channel 324, which may be configured to receive a raised elongate rib 44 of a track 42, as perhaps best illustrated in FIG. 1. Track 42 also may be referred to herein as an elongate track 42 and may be formed from one or more elongate track segments, or track sections, 46, which may be operatively attached to one another to define any suitable track length. During operation of track saws 40, track 42 may be operatively attached, or clamped, to workpiece 98 such that an edge of the track corresponds to a desired cut line for the track saw. Subsequently, the track saw may be positioned, relative to the track, such that raised elongate rib 44 is positioned within rib-receiving channel 324, and the track saw then may be translated along at least a fraction of the length of the elongate track, thereby producing a straight cut along the desired cut line.

As discussed, circular saws 10 include blade guard 80. Blade guard 80 may be configured to cover, to house, and/or to contain at least a region of circular saw blade 200, such as to prevent, or to decrease a potential for, contact between the user and the circular saw blade. In some examples of circular saws 10, blade guard 80 may include a retractable region 82, as illustrated in FIG. 1. The retractable region may be configured to fold, rotate, and/or otherwise retract when the circular saw is utilized to cut the workpiece. Retractable region 82 additionally or alternatively may be referred to as a retracting region 82 and/or a collapsing region 82.

Figure 11:
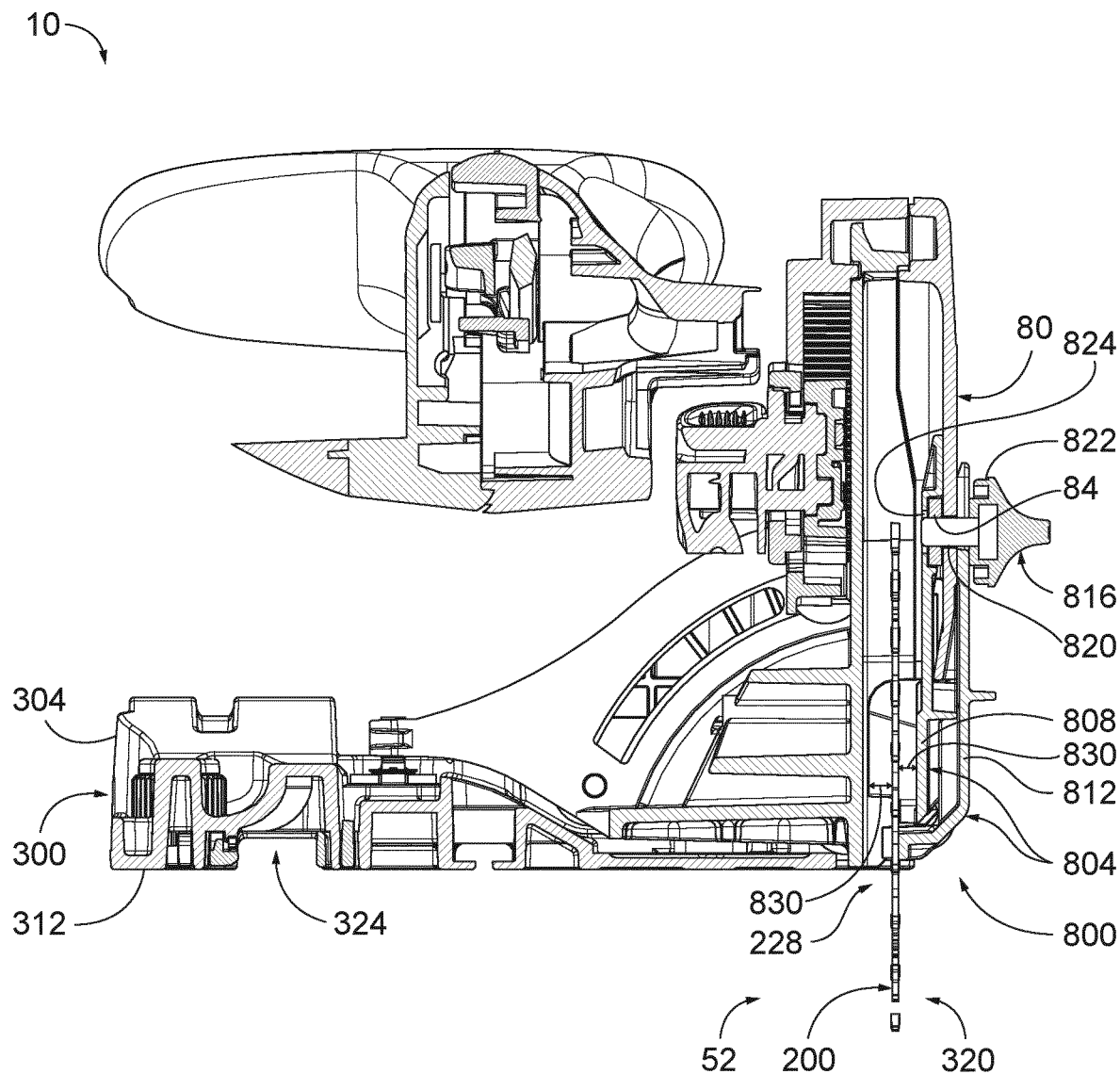
FIG. 11 is a less schematic cross-sectional view of the circular saw of FIGS. 2-10 taken along line 11-11 of FIG. 3.
Figure 13:
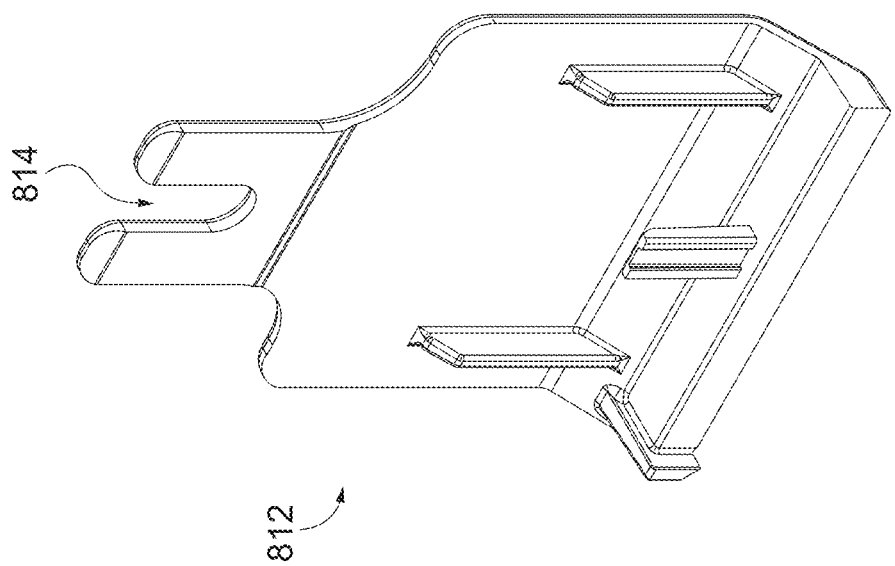
FIG. 13 is another less schematic illustration of the opaque cover of FIG. 12.
Figure 12:
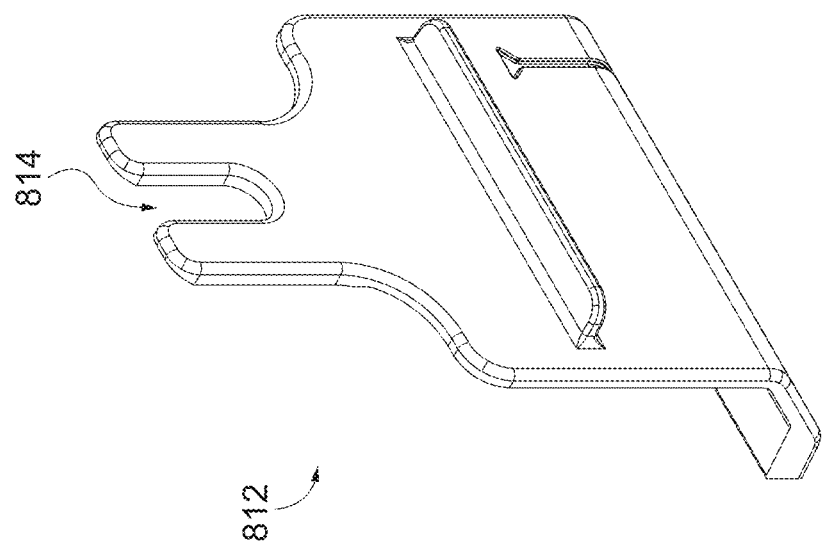
FIG. 12 is a less schematic illustration of an example of an opaque cover, according to the present disclosure.
Figure 15:
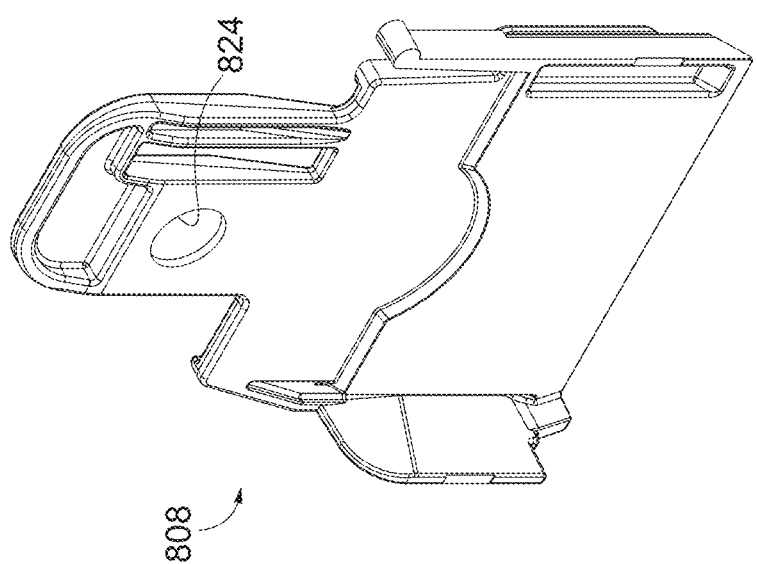
FIG. 15 is another less schematic illustration of the transparent window of FIG. 14.
Figure 14:
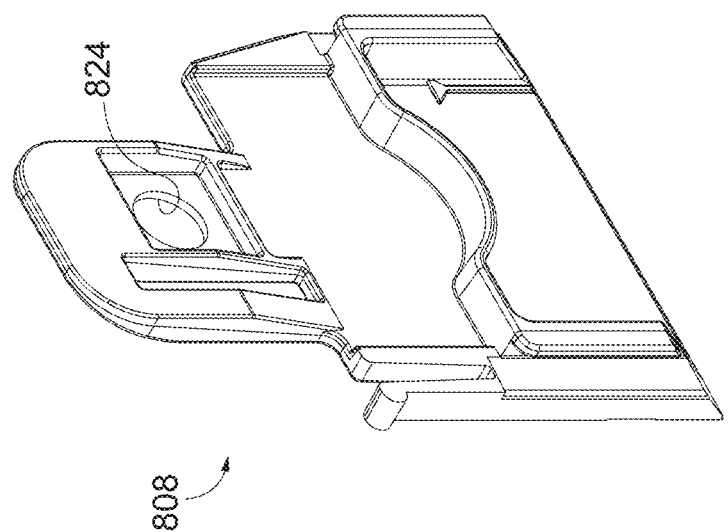
FIG. 14 is a less schematic illustration of an example of a transparent window, according to the present disclosure.

FIG. 11 is a less schematic cross-sectional view of the circular saw of FIGS. 2-10 taken along line 11-11 of FIG. 3. FIGS. 12-13 illustrate covers 804 in the form of a splinter guard 812, that may be included in and/or utilized with circular saws 10, and FIGS. 14-15 illustrate covers 804 in the form of a transparent, or optically transparent, window, 808 that may be included in and/or utilized with circular saws 10. Window 808 additionally or alternatively may be referred to as a transparent, or optically transparent, cover 808. As perhaps best illustrated in FIGS. 1 and 11, splinter guard 812 may be configured to be selectively attached to blade guard 80 such that the splinter guard covers, or at least partially covers, both blade guard opening 800 and transparent window 808 and/or such that the splinter guard extends, or is positioned, on an offcut side of the transparent window. This operative attachment may be via a cover fastening structure 816.

Figure 16:
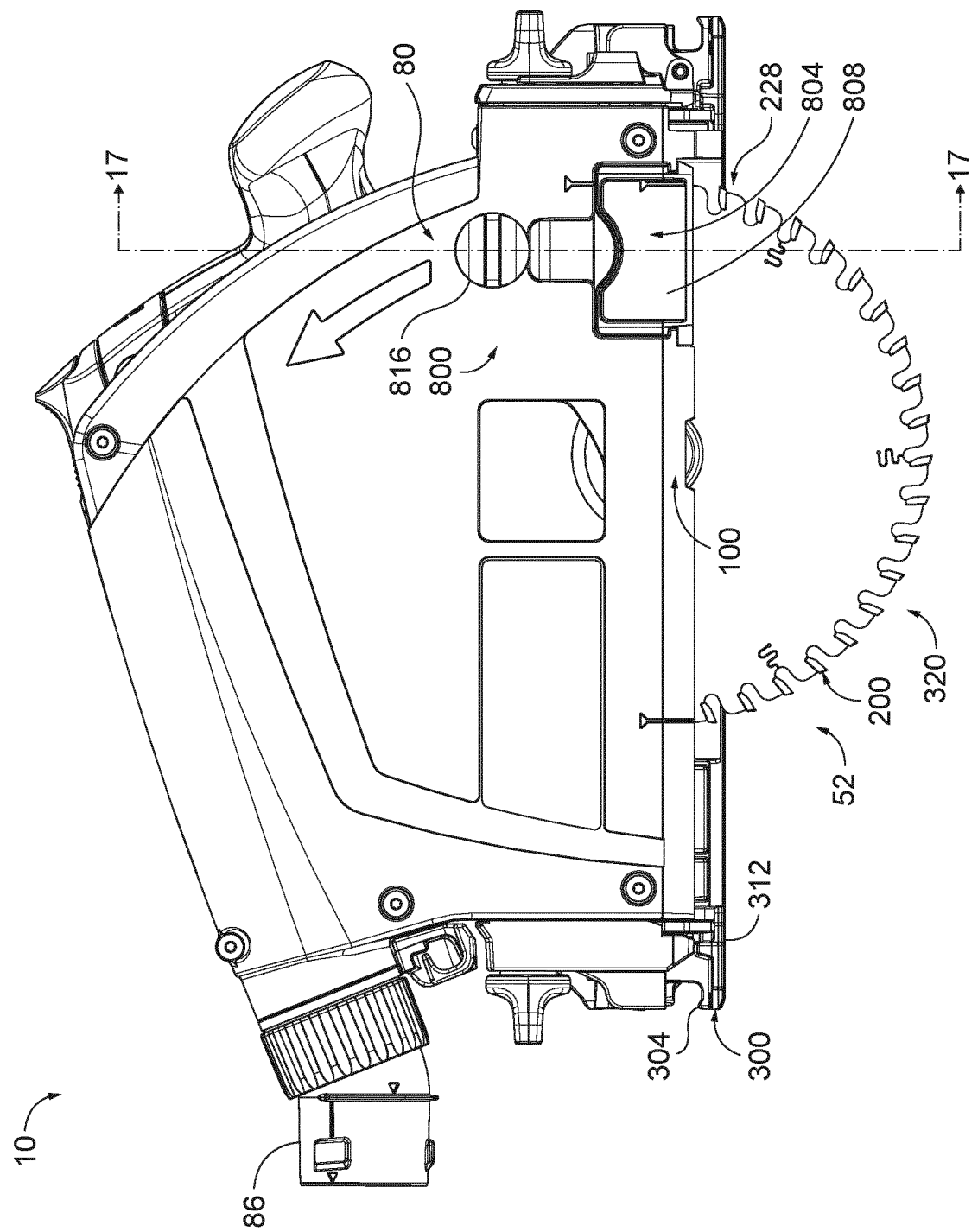
FIG. 16 is a less schematic right side view of an example of a circular saw according to the present disclosure.
Figure 17:
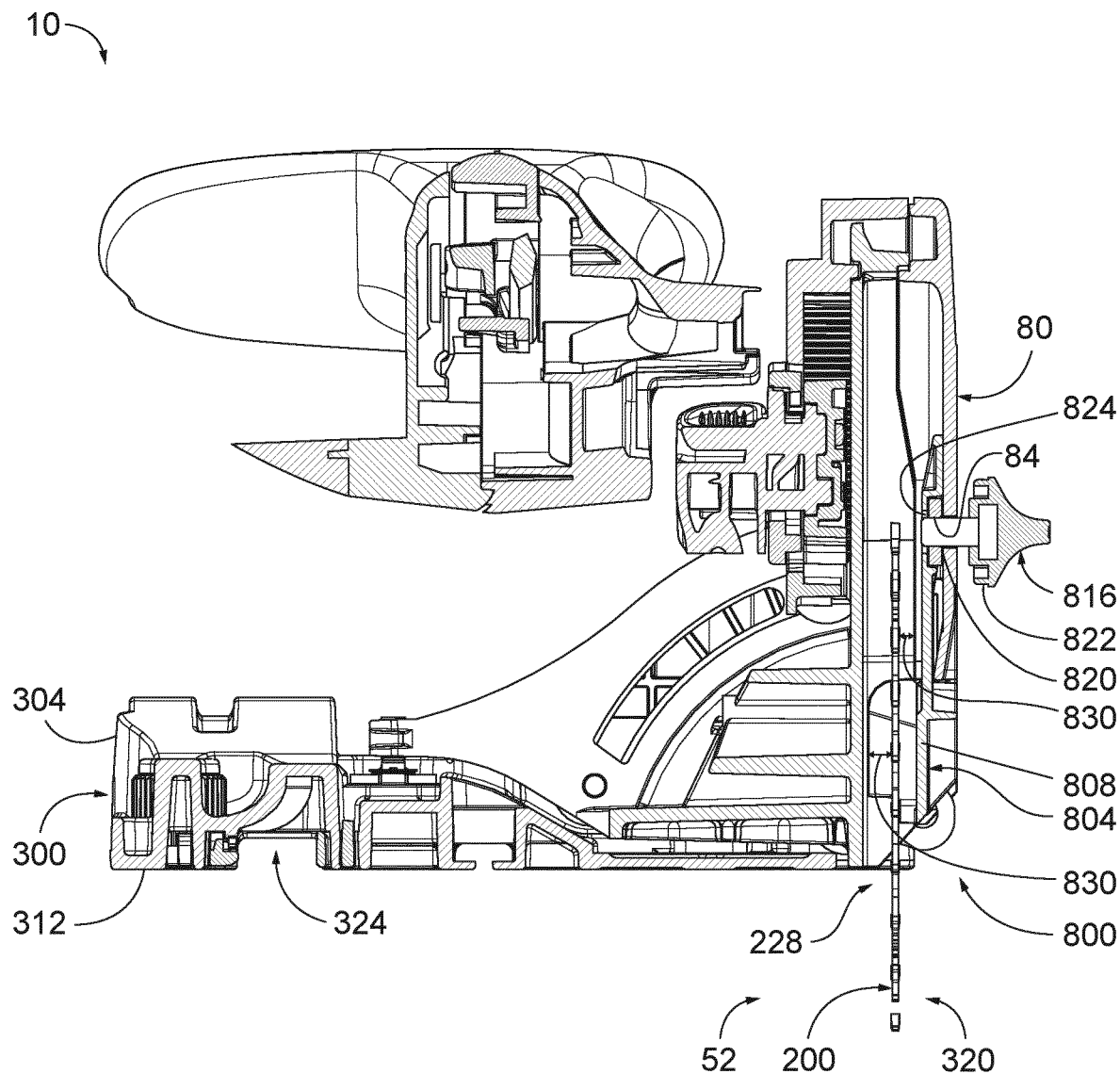
FIG. 17 is a less schematic cross-sectional view of the circular saw of FIGS. 2-16 taken along line 17-17 of FIG. 16.
Figure 18:
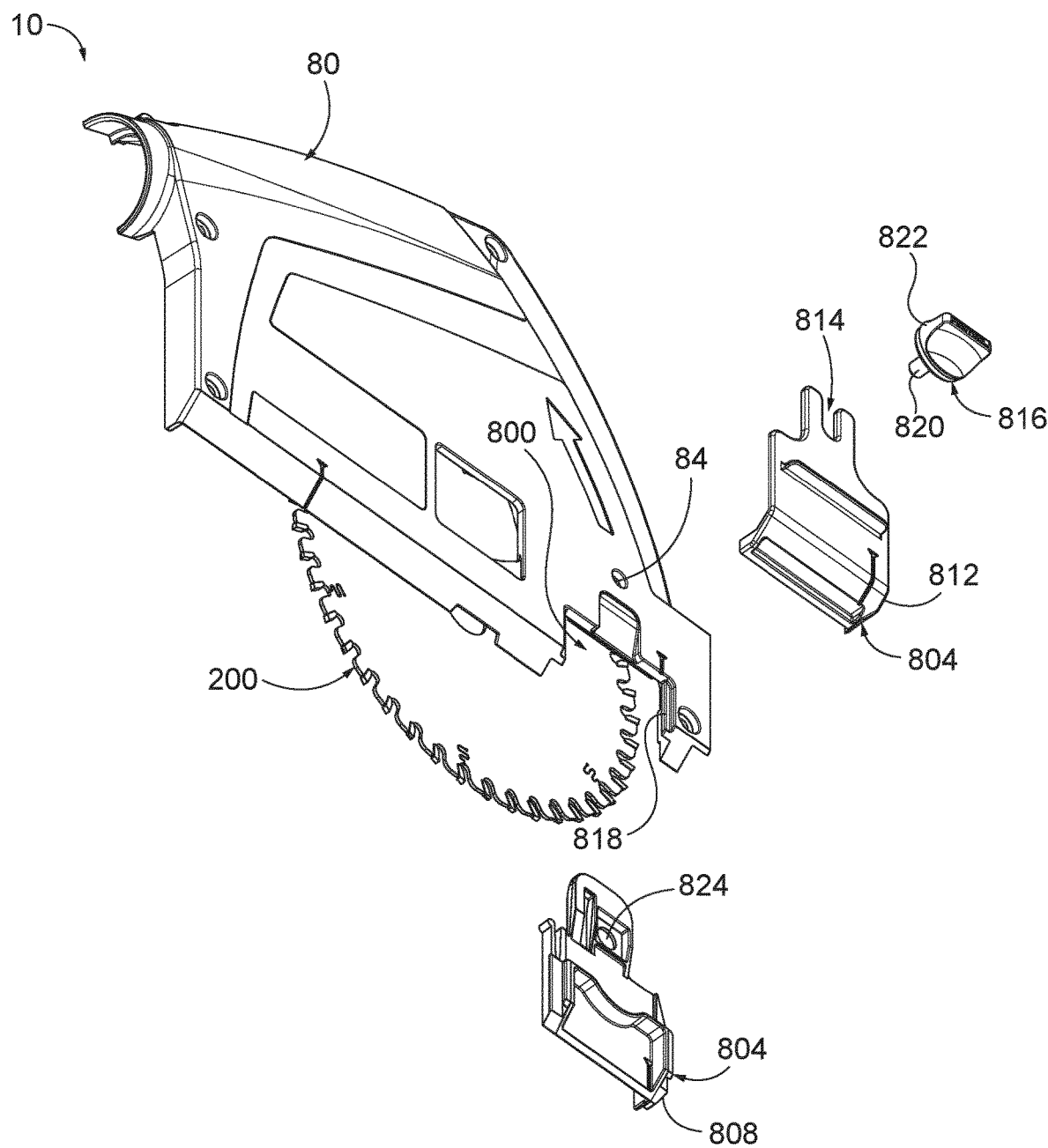
FIG. 18 is an exploded view of a portion of the circular saw of FIGS. 2-17.

However, as discussed in more detail herein, circular saws 10 also may be configured to be utilized without splinter guard 812, without the splinter guard being attached to the blade guard, and/or without the splinter guard covering the transparent window. With this in mind, FIG. 16 is a less schematic right side view of circular saw 10 with splinter guard 812 removed and FIG. 17 is a less schematic cross-sectional view of circular saw 10 taken along line 17-17 of FIG. 16. FIG. 18 is an exploded view of a portion of circular saw 10 and illustrating blade guard 80, covers 804, and cover fastening structure 816.

Circular saws 10 and/or components thereof illustrated in FIGS. 11-18 may include and/or be more detailed and/or different illustrations, views, and/or examples of circular saws 10 of FIGS. 1-10. As such, any of the structures, functions, and/or features disclosed herein with reference to circular saws 10 of FIGS. 11-18 may be (but are not required in all embodiments to be) included in and/or utilized with circular saws 10 of FIGS. 1-10 without departing from the scope of the present disclosure. Similarly, any of the structures, functions, and/or features disclosed herein with reference to circular saws 10 of FIGS. 1-10 may be (but are not required in all embodiments to be) included in and/or utilized with circular saws 10 of FIGS. 11-18 without departing from the scope of the present disclosure.

As discussed, blade guard opening 800 is positioned to permit a user of the circular saw to view a leading edge 228 of a circular saw blade 200 of the circular saw as the circular saw cuts a workpiece. Blade guard 80 may be an opaque, optically opaque, and/or non-transparent, blade guard 80. As such, the user may be unable to see and/or view leading edge 228 of circular saw blade 200 except through and/or via blade guard opening 800, at least when the circular saw is utilized to cut the workpiece. Stated another way, the user may be unable to view any structure that is internal to blade guard 80 via and/or through the blade guard, or a blade guard material that defines the blade guard, at least when the circular saw is utilized to cut the workpiece. Instead, and if desired, the user may view the leading edge of the circular saw blade via blade guard opening 800.

As also discussed, circular saws 10 and/or blade guard 80 thereof include transparent window 808, which may be positioned in, may extend within, and/or may cover blade guard opening 800. However, transparent window 808 may be at least partially, or even completely, optically transparent. As such, the user still may be able to view the leading edge of the circular saw blade via blade guard opening 800 by looking through transparent window 808. Transparent window 808 also may be configured to restrict physical contact between the user and the circular saw blade, through the blade guard opening, as the circular saw cuts the workpiece.

Transparent window 808 may be configured to remain in place or not to be removed and/or separated from blade guard 80. Stated another way, circular saws 10 may be intended for operation with transparent window 808 covering, or always covering, blade guard opening 800. However, and as perhaps best illustrated in FIG. 18, transparent window 808 also may be configured to be selectively separated from circular saws 10, separated from blade guard 80, and/or detached from the blade guard, such as to permit and/or to facilitate cleaning, repair, and/or replacement of the transparent window. As an example, and with continued reference to FIG. 18, blade guard 80 may include a window attachment structure 818, which may be configured to operatively attach transparent window 808 to blade guard 80. As examples, window attachment structure 818 may be configured to receive, to interface with, and/or to engage a corresponding region and/or portion of transparent window 808 to permit and/or to facilitate this operative attachment. Examples of window attachment structure 818 include a slot, a rib, a track, a protrusion, and/or a receptacle that may be at least partially defined by and/or within blade guard 80.

Transparent window 808 may include and/or may be formed from any suitable window material. Examples of the window material include an optically transparent window material, a glass, a polymer, and/or a polycarbonate.

Splinter guard 812 also may be referred to herein as and/or may be a chip protector 812. Splinter guard 812 may have any suitable transparency, and thus may be optically opaque, optically transparent, optically translucent, and/or may include regions of two or more of these optical properties. Splinter guard 812 may be configured to selectively cover, or extend across, at least a portion of, and optionally all of, both blade guard opening 800 and transparent window 808, such as to protect the transparent window from damage and/or to block visual inspection of the circular saw blade via the blade guard opening. Stated another way, splinter guard 812, when present, may at least partially define an external surface of the circular saw. Stated another way, and as perhaps best illustrated in FIGS. 1 and 11, transparent window 808 may extend, or be positioned, between splinter guard 812 and the circular saw blade. Splinter guard 812 additionally or alternatively may be configured to press against the workpiece when the circular saw is utilized to cut the workpiece, thereby decreasing a potential for splintering and/or chipping of the workpiece.

As discussed, splinter guard 812 may be configured for selective attachment to the circular saw and/or for selective detachment from the circular saw. Stated another way, the user of the circular saw may choose to utilize the circular saw with the splinter guard attached and/or may choose to utilize the circular saw with the splinter guard detached. With this in mind, circular saws 10 and/or splinter guard 812 thereof further may include a cover fastening structure 816. Cover fastening structure 816 may be configured to permit and/or to facilitate selective attachment of the splinter guard to the blade guard and/or selective separation, or detachment, of the splinter guard from the blade guard, such as by turning and/or threading the cover fastening structure into and/or out of the blade guard, or a threaded receptacle 84 of the blade guard, as illustrated in FIGS. 11 and 17-18. Examples of cover fastening structure 816 include a threaded fastener, a thumb screw, a cam, and/or a selectively engaged frictional and/or compressive interface.

In some examples of circular saws 10, cover fastening structure 816 may be configured to permit and/or to facilitate selective attachment and/or detachment of splinter guard 812 to blade guard 80 without, or without the need to, separate the cover fastening structure from the blade guard. Stated another way, the cover fastening structure may be configured to permit selective attachment and/or detachment of the splinter guard relative to the blade guard while the cover fastening structure is, or remains, operatively attached to the blade guard.

As an example, and as perhaps best illustrated in FIGS. 12-13 and 18, splinter guard 812 may include a slot 814, and the cover fastening structure may include a threaded protrusion 820, which is perhaps best illustrated in FIGS. 11 and 17-18. In some such examples, the cover fastening structure may be configured to be loosened to permit the splinter guard to be positioned such that the threaded protrusion extends within the slot and/or such that the splinter guard extends on opposed sides of the threaded protrusion. The cover fastening structure then may be configured to be tightened against the splinter guard to retain the splinter guard on the circular saw. In such a configuration, a head 822 of cover fastening structure 816 may be configured to be selectively tightened against splinter guard 812, as illustrated in FIG. 11, to retain the splinter guard on the circular saw. Additionally or alternatively, cover fastening structure 816 may be selectively loosened, thereby separating head 822 from splinter guard 812 and/or permitting the splinter guard to be removed, or slid away from, blade guard 80.

In some examples of circular saws 10, cover fastening structure 816 additionally or alternatively may be configured to retain transparent window 808 within blade guard opening 800. As an example, and as perhaps best illustrated in FIGS. 11, 14-15, and 17-18, transparent window 808 may include an aperture 824 and threaded protrusion 820 of cover fastening structure 816 may be configured to extend through the aperture. In such a configuration, cover fastening structure 816 may be selectively loosened, but not separated, from blade guard 80 to permit attachment of splinter guard 812 to blade guard 80 and/or separation of the splinter guard from the blade guard. Additionally or alternatively, cover fastening structure 816 may be separated from blade guard 80 to permit transparent window 808 to be separated from the blade guard.

As discussed, conventional circular saws may include guard projections, such as ribs and/or fingers, which may project from a conventional blade guard thereof and/or toward the circular saw blade, such as to decrease a potential for contact between the user and the rotating circular saw blade and/or to decrease a potential for an object to be lodged between the conventional blade guard and the rotating circular saw blade. While at least somewhat effective, such guard projections purposefully decrease clearance between the conventional blade guard and the circular saw blade, which may make it difficult to remove the circular saw blade from the circular saw and/or may decrease dust collection efficiency. In contrast with such conventional circular saws, circular saws 10, according to the present disclosure, are configured to be operated with transparent window 808 covering blade guard opening 800. Such a configuration may permit circular saws 10 to omit, or to not include, such guard projections, thereby substantially increasing a clearance 830, as illustrated in FIGS. 1, 11, and 17, between circular saw blade 200 and blade guard 80 when compared to conventional circular saws. Clearance 830 also may be referred to herein as and/or may be an average clearance 830, a mean clearance 830, and/or a minimum clearance 830. As an example, clearance 830 in circular saws 10 may be at least a threshold multiple of a corresponding clearance within a corresponding conventional circular saw. Examples of the threshold multiple include multiples of 1.1, 1.2, 1.3, 1.4, 1.5, 1.6, 1.7, 1.8, 1.9. 2.0, 2.25, 2.5, 2.75, 3, 3.5, 4, 4.5, or 5.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of circular saws according to the present disclosure are presented in the following enumerated paragraphs.

A1. A circular saw, comprising:
- a motor including a motor shaft configured to rotate about a shaft rotational axis;
- an arbor configured to operatively attach a circular saw blade to the circular saw and rotate the circular saw blade about an arbor rotational axis when the arbor receives a torque from the motor via rotation of the motor shaft about the shaft rotational axis;
- a blade guard, wherein the blade guard includes a blade guard opening positioned to permit a user of the circular saw to view a leading edge of the circular saw blade as the circular saw cuts a workpiece; and
- a transparent window that at least one of extends within the blade guard opening and covers the blade guard opening.

A2. The circular saw of paragraph A1, wherein the blade guard is an optically opaque blade guard.

A3. The circular saw of any of paragraphs A1-A2, wherein the transparent window is configured to restrict physical contact between the user and the circular saw blade, via the blade guard opening, as the circular saw cuts the workpiece.

A4. The circular saw of any of paragraphs A1-A3, wherein the transparent window is configured to permit the user to view the leading edge of the circular saw blade, through the transparent window, as the circular saw cuts the workpiece.

A5. The circular saw of any of paragraphs A1-A4, wherein the transparent window is optically transparent.

A6. The circular saw of any of paragraphs A1-A5, wherein the transparent window is configured to be selectively separated from the circular saw.

A7. The circular saw of any of paragraphs A1-A6, wherein the blade guard includes a window attachment structure configured to operatively attach the transparent window to the blade guard.

A8. The circular saw of paragraph A7, wherein the window attachment structure includes at least one of a slot, a rib, a track, a protrusion, and/or a receptacle.

A9. The circular saw of any of paragraphs A1-A8, wherein the transparent window is formed from at least one of an optically transparent window material, a glass, a polymer, and a polycarbonate.

A10. The circular saw of any of paragraphs A1-A9, wherein the blade guard is free of guard projections that project from the blade guard and toward the circular saw blade.

A11. The circular saw of any of paragraphs A1-A10, wherein the circular saw further includes a splinter guard configured to be operatively attached to the blade guard while the transparent window extends within the blade guard opening.

A12. The circular saw of paragraph A11, wherein the splinter guard is configured to cover, or at least partially cover, the transparent window.

A13. The circular saw of any of paragraphs A11-A12, wherein the splinter guard is positioned on an offcut side of the transparent window.

A14. The circular saw of any of paragraphs A11-A13, wherein the splinter guard is at least one of an optically opaque splinter guard, an optically transparent splinter guard, and a translucent splinter guard.

A15. The circular saw of any of paragraphs A11-A14, wherein the splinter guard is configured to press against the workpiece, when the circular saw is utilized to cut the workpiece, to decrease a potential for splintering of the workpiece.

A16. The circular saw of any of paragraphs A1-A15, wherein the circular saw includes a cover fastening structure configured to permit selective attachment of a/the splinter guard to the blade guard and/or selective separation of the splinter guard from the blade guard while the transparent window extends within the blade guard opening.

A17. The circular saw of paragraph A16, wherein the cover fastening structure is configured to permit the selective attachment of the splinter guard to the blade guard while the cover fastening structure remains operatively attached to the blade guard.

A18. The circular saw of any of paragraphs A16-A17, wherein the splinter guard includes a slot, wherein the cover fastening structure includes a threaded protrusion, and further wherein the cover fastening structure is configured to be loosened to permit the splinter guard to be positioned such that the threaded protrusion extends within the slot and subsequently is tightened against the splinter guard to retain the splinter guard on the circular saw.

A19. The circular saw of any of paragraphs A16-A18, wherein the cover fastening structure further is configured to retain the transparent window within the blade guard opening.

A20. The circular saw of paragraph A19, wherein the transparent window includes an aperture, and further wherein the cover fastening structure is configured to extend through the aperture when the cover fastening structure operatively retains the transparent window within the blade guard opening.

A21. The circular saw of any of paragraphs A1-A20, wherein the motor includes at least one of an electric motor, an AC electric motor, a DC electric motor, a brushless DC motor, a variable-speed motor, and a single-speed motor.

A22. The circular saw of any of paragraphs A1-A21, wherein the circular saw further includes a gripping region configured to be gripped by the user of the circular saw during operation of the circular saw to cut the workpiece.

A23. The circular saw of any of paragraphs A1-A22, wherein the circular saw further includes a switch configured to selectively apply an electric current to at least one other component of the circular saw.

A24. The circular saw of any of paragraphs A1-A23, wherein the blade guard is configured to prevent contact between the user and the circular saw blade.

A25. The circular saw of paragraph A24, wherein the blade guard includes a retractable region configured to retract when the circular saw is utilized to cut the workpiece.

A26. The circular saw of any of paragraphs A1-A25, wherein the circular saw further includes a workpiece support configured to position the workpiece and the circular saw relative to one another when the workpiece is cut by the circular saw.

A27. The circular saw of any of paragraphs A1-A26, wherein the circular saw further includes at least one of:
- (i) a power cord configured to provide electric current to the circular saw; and
- (ii) a battery configured to provide electric current to the circular saw.

A28. The circular saw of any of paragraphs A1-A27, wherein the circular saw is at least one of:
(i) a handheld circular saw;
(ii) a radial arm saw;
(iii) a plunge saw;
(iv) a track saw; and
(v) a bevel saw.

A29. The circular saw of any of paragraphs A1-A28, wherein the circular saw is a plunge saw.

A30. The circular saw of paragraph A29, wherein the plunge saw includes a base plate that defines an arbor-facing side and an arbor-opposed side.

A31. The circular saw of paragraph A30, wherein the arbor is operatively attached to the arbor-facing side of the base plate via a base plate pivot.

A32. The circular saw of paragraph A31, wherein the arbor and the base plate are configured to operatively rotate, relative to one another, about the base plate pivot to selectively vary a region of the circular saw blade that extends on the arbor-opposed side of the base plate.

A33. The circular saw of any of paragraphs A1-A32, wherein the circular saw is a/the track saw.

A34. The circular saw of paragraph A33, wherein the track saw includes a/the base plate that defines an/the arbor-facing side and an/the arbor-opposed side.

A35. The circular saw of paragraph A34, wherein the base plate further includes a rib-receiving channel configured to receive a raised elongate rib of a track.

A36. The circular saw of paragraph A35, wherein the track saw further includes the track, and wherein the track includes the raised elongate rib.

A37. The circular saw of any of paragraphs A1-A36, wherein the circular saw includes the circular saw blade.

A38. The circular saw of paragraph A37, wherein the circular saw blade is operatively attached to the circular saw via the arbor for rotational movement with the arbor.

INDUSTRIAL APPLICABILITY

The circular saws and methods disclosed herein are applicable to the power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A circular saw, comprising:
a motor including a motor shaft configured to rotate about a shaft rotational axis;
an arbor configured to operatively attach a circular saw blade to the circular saw and rotate the circular saw blade about an arbor rotational axis when the arbor receives a torque from the motor via rotation of the motor shaft about the shaft rotational axis;
a blade guard, wherein the blade guard includes a blade guard opening positioned to permit a user of the circular saw to view a leading edge of the circular saw blade as the circular saw cuts a workpiece;
a transparent window that extends within the blade guard opening;
a splinter guard configured to at least partially cover the transparent window; and
a cover fastener configured to selectively attach the splinter guard to the blade guard while the transparent window extends within the blade guard opening.

2. The circular saw of claim 1, wherein the blade guard is an optically opaque blade guard.

3. The circular saw of claim 1, wherein the transparent window is configured to restrict physical contact between the user and the circular saw blade, via the blade guard opening, as the circular saw cuts the workpiece.

4. The circular saw of claim 1, wherein the transparent window is configured to permit the user to view the leading edge of the circular saw blade, through the transparent window, as the circular saw cuts the workpiece.

5. The circular saw of claim 1, wherein the transparent window is optically transparent.

6. The circular saw of claim 1, wherein the blade guard includes a window attachment structure configured to operatively attach the transparent window to the blade guard.

7. The circular saw of claim 6, wherein the window attachment structure includes a rib.

8. The circular saw of claim 1, wherein the blade guard is configured to prevent contact between the user and the circular saw blade.

9. The circular saw of claim 8, wherein the blade guard includes a retractable region configured to retract when the circular saw is utilized to cut the workpiece.

10. The circular saw of claim 1, wherein the splinter guard is positioned on an offcut side of the transparent window.

11. The circular saw of claim 1, wherein the splinter guard is an optically opaque splinter guard.

12. The circular saw of claim 1, wherein the circular saw further includes a grip configured to be gripped by the user of the circular saw during operation of the circular saw to cut the workpiece.

13. The circular saw of claim 1, wherein the cover fastener is configured to permit the selective attachment of the splinter guard to the blade guard while the cover fastener remains operatively attached to the blade guard.

14. The circular saw of claim 13, wherein the splinter guard includes a slot, wherein the cover fastener includes a threaded protrusion, and further wherein the cover fastener is configured to be loosened to permit the splinter guard to be positioned such that the threaded protrusion extends within the slot and subsequently is tightened against the splinter guard to retain the splinter guard on the circular saw.

15. The circular saw of claim 1, wherein the cover fastener further is configured to retain the transparent window within the blade guard opening.

16. The circular saw of claim 15, wherein the transparent window includes an aperture, and further wherein the cover fastener is configured to extend through the aperture when the cover fastener operatively retains the transparent window within the blade guard opening.

17. The circular saw of claim 1, wherein the motor is a brushless DC motor.

* * * * *